(12) United States Patent  
Dukhovny (10) Patent No.: US 8,775,597 B2  
(45) Date of Patent: Jul. 8, 2014

(54) TECHNIQUE FOR MANAGEMENT OF COMMUNICATION NETWORKS

(75) Inventor: Vadim Dukhovny, Petach-Tikva (IL)

(73) Assignee: ECI Telecom Ltd., Petach-Tikva (IL)

( * ) Notice: Subject to any disclaimer, the term of this patent is extended or adjusted under 35 U.S.C. 154(b) by 109 days.

(21) Appl. No.: 13/476,642

(22) Filed: May 21, 2012

(65) Prior Publication Data

US 2012/0303780 A1    Nov. 29, 2012

(30) Foreign Application Priority Data

May 26, 2011   (IL) ........................................ 213159

(51) Int. Cl.  
*G06F 15/173*    (2006.01)

(52) U.S. Cl.  
USPC ............ 709/223; 709/220; 709/221; 709/222

(58) Field of Classification Search  
USPC .......................... 709/220, 221, 222, 223, 224  
See application file for complete search history.

(56) References Cited

U.S. PATENT DOCUMENTS

| | | | |
|---|---|---|---|
| 6,259,679 B1* | 7/2001 | Henderson et al. | 370/254 |
| 7,751,707 B2 | 7/2010 | Zaacks et al. | |
| 8,018,860 B1* | 9/2011 | Cook | 370/244 |
| 2005/0198251 A1* | 9/2005 | Toda | 709/223 |
| 2005/0201299 A1* | 9/2005 | Radi et al. | 370/254 |
| 2008/0159506 A1* | 7/2008 | Raheja | 379/201.12 |

* cited by examiner

*Primary Examiner* — Liangche A Wang  
*Assistant Examiner* — Cheikh Ndiaye  
(74) *Attorney, Agent, or Firm* — Novick, Kim & Lee, PLLC; Harold L. Novick; Jae Youn Kim (57) ABSTRACT

A method of managing a communication network, using a multi-layer management system having at least two management layers each comprising one or more elements, which elements serving as managing entities and/or managed objects. The method comprises performing a network operation simulation at a selected management level of the system, by one or more selected managing entities, while, at the time of the simulation, comprises interrupting management communication between the one or more selected managing entities and elements in an underlying management layer.

6 Claims, 5 Drawing Sheets

| XS | Multicast Config | Multicast Status | CFM Performance | Monitoring | Alarms |

—1G—ETY—1—

Domain External NNI  Type L2 ETY NNI  Bandwidth 1000000

C-Vlans | Ingress Policers | Egress Policers

☐ Proloing All

| CoS List | | | | | | | | State | Profile |
|---|---|---|---|---|---|---|---|---|---|
| 0 | 1 | 2 | 3 | 4 | 5 | 6 | 7 | | |
| ☐ | ☐ | | ☐ | | ☐ | | | | |
| ☑ | ☑ | | ☐ | | ☐ | | | Policing | Profile0_CIR_500_EIR_345 |
| ☐ | ☐ | | ☑ | | ☐ | | | No Rate Limit | |
| ☐ | ☐ | | ☐ | | ☑ | | | Policing | operator 1 |

*FIG. 4*

SWITCH PORTS

| 17 □ UNI NO | 18 □ UNI NO | 19 □ Yes | 20 □ Yes | 21 □ Yes | 22 □ Yes | 23 □ Yes | 24 □ Yes | 25 □ Yes | 26 □ Yes | 27 □ Yes | 28 □ Yes | 29 □ Yes | 30 □ Yes | 31 □ MOT NO | 32 □ MOT NO |

XDM_1000-102:SLOT# IG MCS10 :SWITCH

| ALARM | STATUS | CONFIGURATION | CONNECTIONS | MAINTENANCE | PERFORMANCE | INVENTORY |

| GENERAL | WRED | POLICER PROFILES | RSTP | FDB |

─ SWITCH RSTP CONFIGURATION ─
BRIDGE PRIORITY  8192    ETHERNET ADDRESS 00200004    FWD DELAY(4-30s)15

┌ MOTIFICATION ENABLE ┐
   NO      YES                MAX AGE(6-40s) 20           HELLO TIME(1-10s)2

BPQU FRAME FORMAT

PORT RSTP CONFIGURATION

| PORT | RSTP ENABLED | STATE | PATH COST | DESIGNATED COST | PORT PRIORITY |
|---|---|---|---|---|---|
| IG-ETY-1 | DISABLE | DISABLED | 1000000 | | 128 |
| IG-ETY-2 | DISABLE | DISABLED | 1000000 | | 128 |

*FIG.5*

TECHNIQUE FOR MANAGEMENT OF COMMUNICATION NETWORKS

CROSS-REFERENCE TO RELATED APPLICATIONS

This application claims priority of Israel Patent Application No. IL 213159, filed May 26, 2011, the disclosure of which is incorporated by reference herein in its entirety.

FIELD OF THE INVENTION

The present invention relates to a technology of management of communication networks, and more specifically to a technology of introducing changes into a modern multilayer communication network by minimally affecting its traffic.

BACKGROUND

It is a well-known problem that, in present network management systems, a network operator cannot see at a glance the whole picture of a communication network to be managed especially while the network operator monitors or tries to introduce any changes in the network. Such difficulty, of course, hampers both any reconfiguring of the network, and any attempts to change traffic flows in the network. Since any changes cannot be adequately analyzed in advance at the upper level of network management it become traffic-affecting.

One of the reasons for such problem is that heterogeneous networks to be managed have different protocol layers. In addition heterogeneous networks are built from layers of different pieces of equipment which are usually produced by different vendors. Different equipment samples have multiple, equipment-specific features and usually demonstrate significant technological gaps between them. Every management application is usually utilized for specific equipment capabilities, and is often technological-layer-oriented (i.e., is characteristic and suitable for its own technological layer). Usually, every management application has its own unique information base, screens and GUIs (Graphical User Interfaces) which are unavailable to other management applications/layers. This means that their information bases and screens cannot be seen and/or used from other layers.

For example, if a user wishes to modify a multipoint-to-multipoint Ethernet service with multiple endpoints which are distributed over different pieces of equipment, there might be a situation when the service will be created successfully at part of the endpoints, while at other endpoints it will fail. The failure may be caused by capabilities and features which may be supported/fulfilled by one type of equipment and not supported/fulfilled by other types of equipment. Such a situation is very undesirable for the end user since the service will appear to be only partially functional. Today there is no suitable pro-active approach which would allow the users to prevent such situation in a complex network comprising heterogeneous equipment. In other words, a modern network management system (NMS) is unable "to see" the whole picture of the network, with its complete set of its capabilities and features.

For example, a conventional system (FIG. 1) for managing a communication network comprises a central management unit (usually called the NMS) at a high management layer. The NMS is in bidirectional communications with a numerous of Element Management Systems (EMS) of a lower management layer EMS-1 ... EMS-N. In turn, each of the EMSs communicates with a number of Network Elements (NE) that forms another, lower (basic) layer in the management system.

Each management layer of the system (NMS, EMS, NEs) has its own control and management applications, which can be defined as a sum or composition of properties and that are being intrinsic and/or performable at this specific layer. Usually, higher management layers of the system have their own software/hardware and GUI. Network elements are usually provided with main cards which serve as controllers of line cards of the network elements.

Figure 1:
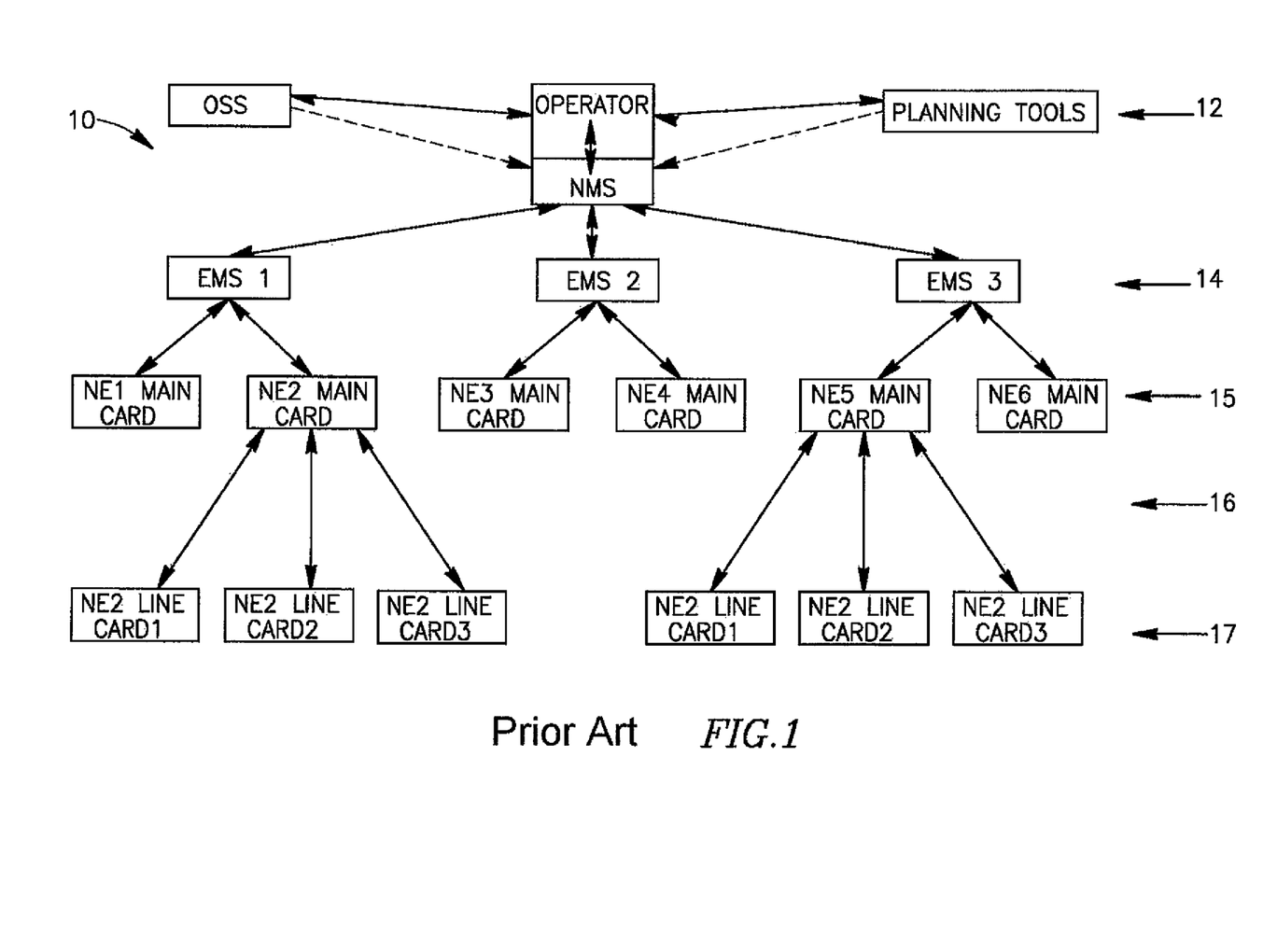
FIG. 1—is a schematic block diagram of a multi-layer network management system operating in a prior art conventional mode.

In the conventional system shown in FIG. 1, the operator interacts with the NMS and may get information about (and/or affect) only such functions which are performed at the level of NMS. For example, functioning of EMS-specific policers can be viewed/studied/affected only at the level of EMS. The term policers refer to software/hardware means for sorting packets at the input and/or output of a communication block, depending on throughput or capacity of the block. Most of the time, at the layer of NMS (for example, in a GUI of the NMS) EMS-specific information is unavailable.

Another example of a problem with the prior art, is that Services Definition and a current specific Quality of Service (QoS) model for traffic can usually be seen/managed only at the layer of EMS (e.g., at its GUI). This information is unavailable at the NMS.

Yet another example is that communication from/to Customer Virtual Local Access Network (CVLAN), and its dynamic association with one or another ports of specific equipment, can be observed and affected only at the layer of the EMS. Again this information is unavailable at the NMS.

Today, in order "to see" the whole picture of the network, the operator working at the level of NMS has to manually collect "a puzzle" of information from different management applications. This is a very difficult, cumbersome, time-consuming and error-prone process, especially nowadays when communication networks grow and their complexity increases.

On the other hand, full transfer of data from all EMSs to the NMS is also not practicable. First of all, it would cause excessive development efforts at the stage of designing NMS. Secondly, it would hamper the NMS operation, would make the working of EMSs cumbersome and would introduce a problem of synchronizing between EMSs and NMS.

An additional problem existing today is that the operator has no comprehensive tools to analyze the network and perform "if-then" (AKA "what-if") simulations for various scenarios of hardware and/or traffic reconfigurations in the network. An "if-then" simulation for a scenario may be understood as a succession of events which may take place between two or more communicating points, when changes in topology and/or traffic are introduced between them. Quite often, end points of services, trails in Synchronous Digital Hierarchy (SDH), tunnels in Multiprotocol Label Switching (MPLS) are situated at different pieces of equipment which may be located at different levels/layers of the network Presently, network simulations are performed by various versions of existing planning tools (which usually are placed at the layer of NMS). The presently known planning tools are intended for calculations and simulations of scenarios based on NMS input only, and for giving optimization recommendations. Such planning tools are isolated, self-contained applications. When the planning tools run software simulations, they do it internally, without any simulation interface to other management applications. Thus, the resulting solution found by such a planning tool may suffer from: low accuracy, and poor feasibility. In addition other problems may arise from the very limited information which is available to the specific planning tool with respect to other, lower management layers of the system.

Some prior art solutions suggest interaction between NMS and EMS layers of a communication system. One idea of carrying a simulation by a central control entity in a network before performing actual changes in that network is described in Applicant's U.S. Pat. No. 7,751,707. This solution proposes a technique for controlling an optical network comprised of network elements (NEs) with the aid of a network controller (NC) that is in communication with the network elements. The technique includes the network controller NC collecting information on the NEs there-from. Whenever a change in the network is requested, the NC simulates operation of the network with the requested change based on the collected information. The NC makes a decision on acceptability of the requested change, and may then cause implementation of the requested change in the network.

However, the above patent refers only to the optical technological layer, and only to a very limited set of changes which could be simulated For example the substitution of one entity (e.g. a network element or optical channel) to another is made. In the solution disclosed in U.S. Pat. No. 7,751,707, the simulation is held only in the Network Controller (NC), is only based on performance monitoring of network elements (NEs), and is not supposed to be held at other layers of the management hierarchy of the system.

SUMMARY OF THE DISCLOSURE

The present invention relates to a technology for managing communication networks by a management system comprising at least two management layers. For example, an upper layer such as an NMS layer manages a lower layer such as an EMS layer. The EMS layer may in turn manage a management layer comprising a plurality of network elements (NE). The NE management layer itself may be further considered as comprising a management layer of NE main cards (programmable controllers). The underlying basic management layer of NE line cards, actually just manages objects of the management system. One object of the present invention is to provide an effective (accurate and inexpensive) method and system for managing/controlling operation of a communication network.

The object of the invention can be achieved by providing a method of communication network management using a multi-layer management system having at least two management layers. Each layer comprises one or more elements, wherein the elements are being (comprising, serving as) managing entities and/or managed objects.

The method comprises performing a network operation simulation at a selected management level of the system by one or more selected managing entities.

While, at the time of the simulation, management communication is interrupted between the one or more selected managing entities and elements in an underlying management layer. (Interrupting at least those elements which were respectively managed by the one or more selected managing entities before the simulation).

It should be noted that, in the described management hierarchy, a managing entity of a lower management layer may be a managed object of another managing entity of a higher management layer. At the lowest layer of management, the elements are just managed objects. At the highest management layer, elements are considered managing entities. For example: a NE main card is a managing entity for a NE line card which is a managed entity, while the NE main card is a managed entity of an EMS.

In a particular embodiment, the invention relates to a method for monitoring and managing networks at the level/layer of a NMS, where the selected layer is the NMS layer, the managing entity is the NMS, and the underlying layer is the EMS layer.

For performing the simulation, the NMS may cooperate with a Planning Tool software block. The NMS managing entity should be understood as NMS separately or in combination with the operator/user (and/or a planning tool block and/or OSS), which are considered to be positioned, in the NMS management layer, higher than NMS itself. However, the method may comprise selecting an intermediate management layer (e.g., the EMS layer) for performing the network operation simulation. This method comprises utilizing results of the simulation at a higher management level by forwarding, to the higher management layer, management data and simulation results obtained at the selected management layer.

As an example, the simulation may be performed at the NE management layer, at one or more NE main cards selected as management entities. Generally, all the main cards may enter the simulation mode and cut interconnection with their underlying line cards. The similar arrangement is applicable "mutatis mutandis" to any other management layer (for example, EMS). Results of the simulation may be then utilized at the upper management layers.

According to one embodiment, where there are two layers of management above the "cut off" line (the EMS layer is the selected management layer for the simulation purpose), the simulation will be performed at the level of EMS and the results further reported to the NMS. In a different embodiment when the NMS layer is the selected management layer, the simulation will be provided in the NMS based on the management data previously obtained from the EMSs.

The term "management entity" should be understood as one or more management blocks such as NMS, EMS, NE main card (when provided with an auxiliary simulation module, e.g. a software) of a specific management layer, which directly manages one or more elements (entities or objects) in an underlying layer of the management system.

The term "management data" should be understood as any information passing in the management system. The term management data does not comprise user data/information transmitted in the communication network. The management data includes, for example, configuration orders between NMS and EMSs and further between EMSs and NEs, and validation data normally circulating between the management layers (an example of validation data is when NE or EMS send status reports or reject some orders since they cannot be fulfilled).

The management data can be drawn, for example, by a Corba protocol, a Simple Network Management Protocol (SNMP), TL-1, etc. the protocol used depends on the layer.

According to one embodiment the procedure is performed as follows:
1) entering the simulation mode;
2) performing simulation of one or more desired changes in the network;
3) leaving the simulation mode; and
4) making a decision by user/operator and/or NMS, whether to keep/implement or to discard the simulation results.

In more details, the method may be implemented by the following steps:
  selecting a management layer for simulating the network operation; (When the user starts the simulation mode, he/she chooses the simulation management layer—if it is not chosen by the architect of the network management system.)

selecting one or more managing entities at the selected management layer for performing simulation of one or more desired changes (for example implicitly, by analyzing the user-specified endpoints);

temporarily interrupting management intercommunication between the selected management entity(ies) and at least the elements underlying the selected managing entity within the underlying management layer, thus changing a conventional mode of the management system to a so-called simulation mode (and creating a "wall" in the management system);

performing, at the selected management layer, simulation of the network operation with the desired change(s) in topology and/or traffic (based on the management information earlier obtained from the management layer underlying the selected management layer);

providing information on the simulation to an upper management layer (if any);

based on the performed simulation, making decisions on acceptability of the desired change(s);

returning from the simulation mode to the conventional mode.

It should be emphasized that, in the simulation mode, only management data exchange between the selected layer and the underlying layer is interrupted. Management data above the "wall" and user traffic in the network continues as it was before.

The proposed network operation simulation, with the proposed "cutting off" of the selected management layer from its under-laying management layer may be initiated, for example, by the operator or by a simulating program accommodated at the selected management level.

After performing the simulation mode, or upon a special order, the proposed method may comprise the following steps at one end:

if the desired change(s) is acceptable, propagating the management data in the form of change/configuration orders from the selected management layer to the underlying layers (e.g., from NMS to EMS and further to NEs). This means propagating the management data to one or more NE's main card and further to NE's line cards to implement the desired change. However, if the change is not acceptable (e.g., the user is not satisfied with the result of the simulation, or one of automatic validations fails), the network is left unchanged up to a next simulation. In other words, all the changes, which were entered at the simulation mode, "are rolled back" without implementation in the network.

According to one embodiment the simulation layer may be selected in advance by the designer of the management system. The lower the layer of the managing entity, the more accurate the simulation results will be. The architecture of the management system actually defines which management layer is the "selected layer" (i.e. under which cut-off "wall" will be provided), and which management entity will comprise a suitable simulation module (a managing SW block). If the cut-off is placed "under" the EMS layer, the EMSs will have the simulation module. When the cut-off is planned under the NE main cards, the NE main cards should be provided with the simulation module.

As mentioned before, the simulation performed at a lower layer is always accompanied by transferring information about it and its results upwards, to an upper layer.

To change the mode, a management entity of an upper selected management layer may add a simulation flag to its commands sent towards the underlying (selected) management layer, thereby informing it about the simulation mode and ordering the underlying selected layer to interrupt management communication with its lower management layer. For example, the NMS may enter the simulation flag in a configuration order sent to one or more EMSs to build "a cut-off wall" (also known as a blocking wall) between the EMSs and their underlying NEs. In another example, EMS entity may order its underlying NE main cards to interrupt management communication with their NE line cards.

To return to the previous, conventional mode, the simulation flag may be removed by the responsible managing entity. Changes introduced in the simulation mode may be cancelled just by restoration of a backup performed before the simulation.

The above-proposed technique allows introducing changes in the network by making all trials "off-line" and "free of charge", thus minimally affecting traffic in the network. It not only prevents possible mistakes, but also generally improves functioning of the network, and is very helpful for managing services comprising endpoints on different types of equipment.

Actually, the simulation and the decision functions at the NMS layer may be performed by a new software managing/simulation block at least partially replacing the user/operator. Such new software block at the layer of NMS may constitute the planning tool application provided with additional capabilities. For example, these capabilities can be to communicate with the EMSs, to cease information exchange with the NEs management layer, to simulate desired changes in the simulation mode using both the NMS and EMS layers forces, and to return to the conventional mode with or without the changes which have been simulated.

The desired changes may be simulated as various "if-then" use cases respectively corresponding to various configuration or traffic change scenarios. For example, the changes may involve end-points on different pieces of equipment, characteristics of traffic, characteristics of traffic policers, types and state of protection in the network.

Further, due to the close relation between different technological layers (physical layer, SDH, Ethernet/MPLS, optical, etc), different technological layers are preferably visualized and monitored by simultaneously viewing the desired changes at respective different/split screens/monitors (say, at the NMS layer) The results are then utilized for making decisions. For example, when simulation of some desired traffic changes (route, bandwidth, etc.) seems acceptable at a lower technological layer (e.g., wavelength division multiplexing (WDM), physical layer) but becomes non-acceptable at a higher technological layer (MPLS, Services), the changes may be discarded and the simulation may be repeated for other changes.

When the management system operates according to the above method in the system's simulation mode, the managing entity (user, NMS, planning tool, or in various combinations at the level of NMS, EMS at the level of EMS or main NE card at the level of NE) may initiate it, simulate different scenarios and get the picture of the underlying heterogeneous/multi-layer network on its various layers and equipment elements and devices. Based on the retrieved information the managing entity can take various network reconfiguring, traffic and network optimization decisions.

According to one embodiment the changes and the simulation results are registered as simulation trials at the suitable layer of management. However, the changes are not propagated further to the lower layer (s) and network elements (NEs, or EMBs—embedded circuits or cards). The changes will not take place before making a decision on the simulation.

The simulating module in the managing entity (e.g., at the NMS layer, a software product such as a planning tool initiated by the operator) may be manually enabled (turn on) or disabled (turn off). When operator turns the simulating module mode on, the NMS (or any other managing entity) starts a new simulation transaction and records each configuration change in its data base. When the operator turns the simulating module mode off, all the changed configuration is restored back, exactly as it was before the simulation mode was turned on. Thus, the simulation transaction is closed and all the changes are rolled back. However if the changes have been proven acceptable by the managing entity (upon or during the simulation), these changes may be introduced into the network during the conventional mode. A recommendation may be given by the entity, and the changes may be (immediately or later) introduced into the network.

According to another aspect of the invention, there is a multi-layer management system of a communication network, having at least upper and lower management layers and comprising one or more elements at each of the management layers, the elements serving as managing entities and/or managed objects. Wherein at least one of the management layers being adapted to be assigned as a selected management layer comprises one or more selected managing entities, each of the selected managing entities being provided with a simulation module;

in the system, the at least one selected managing entity is adapted for interrupting exchange of management data between the selected managing entity and elements of a management layer underlying the selected management layer, (without affecting traffic in the network);

performing simulation of the network operation in the simulation module of the selected managing entity, for one or more desired changes, (by utilizing facilities of the selected managing entity);

exchanging management data with a management layer above the selected management layer, if any; and the system being designed for utilizing results of the performed simulation at the upper management layer of the system, for making decisions on applicability of the one or more desired changes.

According to still a further aspect of the invention, there is also proposed a new software product (such as a managing application, a simulation module, a planning tool modified module) comprising data and/or computer implementable instructions stored on a suitable computer readable non-transitory storage medium such as the medium carrying the NMS, the new software product being adapted, when being run on a computer (a controller or a group of controllers of the managing entities, to support and enable performing operations of the proposed method. The product may be located in one or more managing entities of at least one of the management layers).

BRIEF DESCRIPTION OF THE DRAWINGS

The above invention will be further described and illustrated with the aid of the following non-limiting drawings in which.

DETAILED DESCRIPTION OF THE DISCLOSURE

FIG. 1 illustrates a generalized block diagram of an exemplary multi-layer management system 10 in the prior art. The upper layer of management 12 is supervised by an Operator and comprises the NMS block and two optional blocks (Operation Support System OSS and planning tools) which are in communication with the NMS. The planning tools block may be considered to belong either to the management layer of NMS, or to be the uppermost layer of management. An EMS management layer 14 is an intermediate layer, which comprises EMS devices/software in communication with the NMS. Each EMS manages a number of Network Elements NE.

Each of the NEs is usually a complex switching equipment piece. NEs may be routers, switches, cross-connectors, DSLAMs, or the like manufactured by various companies and connected to a number of clients. The plurality of NEs 16 form an NE management layer 15 (which is an NE main cards sub-layer) and an NE line card sub-layer 17 (which is a basic layer of the management pyramid). NEs send (upwards) alarms and status reports, receive configuration orders from an upper (EMS's) layer, and are capable of reconfiguring themselves according to the orders.

The regular management workflow, as depicted, involves "top-down" propagation of the configuration and re-configuration orders, from NMS to EMSes and then further from EMSes to NEs. Alarms (such as loss of signal), rejects (validation reports) and performance monitoring information, concerning condition of the network are propagated "bottom-up" from NEs to EMSes and then to NMS.

Figure 2:
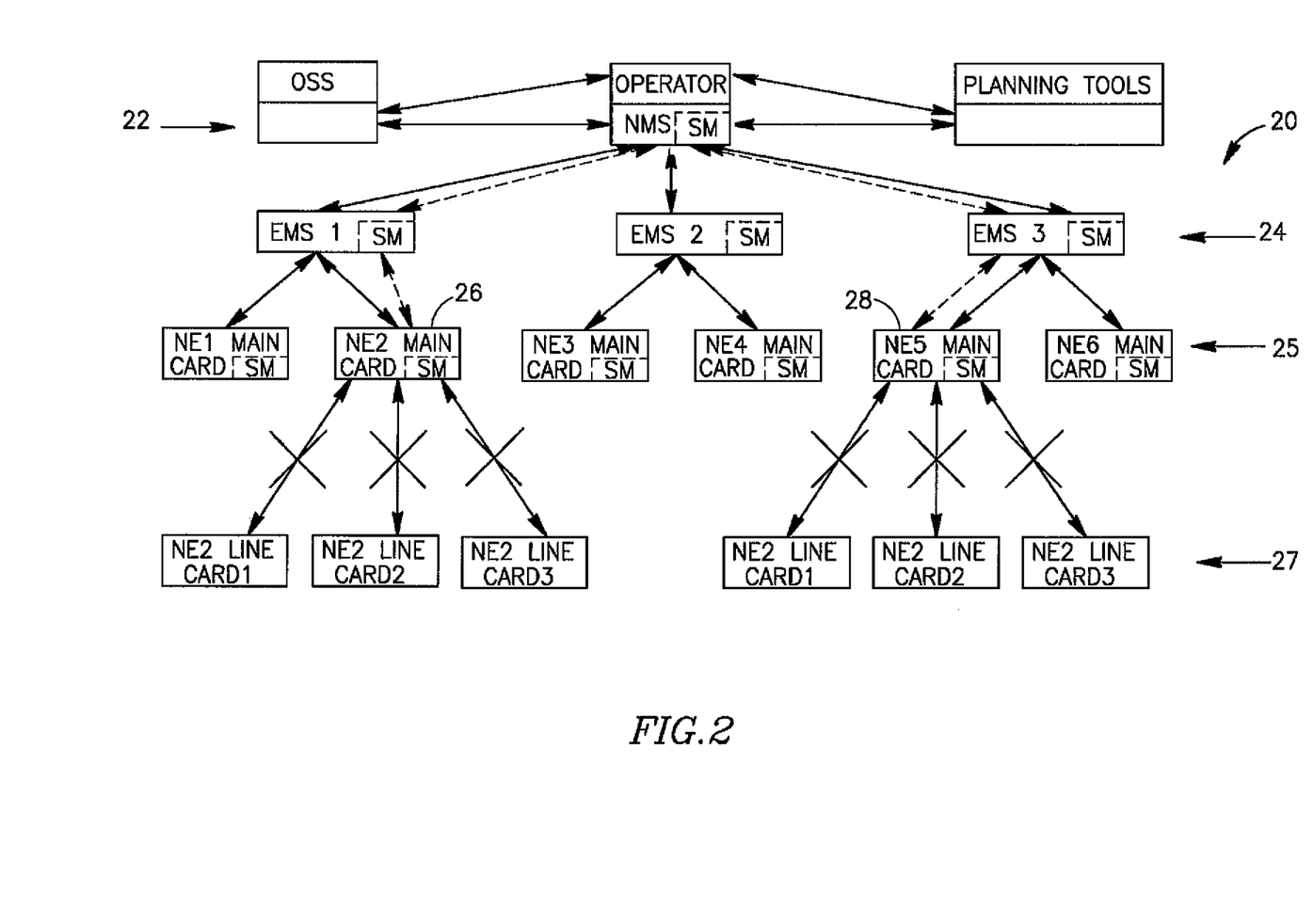
FIG. 2—is a schematic block diagram of the multi-layer management system capable of operating in a simulation mode according to an embodiment of the present invention.

FIG. 2 schematically shows a newly proposed workflow between the management layers in a management system 20 in a newly proposed simulation mode of the system. The system 20 is similar to that (10) shown in FIG. 1, but is provided with novel modules and demonstrates novel features. Each of the management layers comprises its suitable managing entities: NMS of the NMS layer 22, EMSes of the EMS layer 24, NE main embedded cards of the NE managing layer 25.

According to the architecture of management system 20, the NE management layer 25 comprises modified managing entities (NE main cards), namely each of them is provided with a simulation module SM. As an example, if the selected management layer is layer 25, when some desired changes are expected in the communication network, the simulation will be performed at the layer 25. This results in the exchange of management data between layer 25 and the underlying layer 27 being interrupted/ceased. The X's in the figure between layers 25 and 27 illustrate one option of a so-called "Blocking Wall" in the management system 20.

More specifically, when an exemplary change is expected to take place in the traffic flow between the network element NE2 and network element NE5, NMS or an operator (implicitly) will select NE2 main card 26 and NE5 main card 28 as managing entities, with their internal simulation modules SM. For example, it may be performed by propagating a configuration order from the operator/NMS, carrying a simulation flag. Upon receiving such an order, main cards 26 and 28 cease the management interaction with the underlying line cards and start the simulation mode by introducing the changes mentioned in the configuration order and using management information which has been received from the layer 27 prior to cutting off the exchange.

Results of the simulation may be processed (decisions can be made) at the selected layer 25, and they are propagated upwards, up to the NMS management layer. In other examples, the selected managing entity may be an EMS, or the NMS. These entities will thus have simulation modules (not shown). In the simulation mode, all changes that the selected managing entity operator/NMS simulator decides to make in one management layer (e.g. NMS) are immediately reflected in connected elements of the underlying management layers (e.g. EMS of XDM, EMS of BG, EMS of CESR), but not propagated further to the network (for example, to embedded cards of network elements). In the above paragraph, XDM is a multiservice packet optical transport system, CESR is a Carrier Ethernet Switch/Router, and BG is a network node from the family of BroadGate® (BG) equipment, all commercially produced by ECI Telecom Ltd.

The operator may manually enable (turn on) or disable (turn off) the simulation mode, by directly interacting with the simulating module of the selected managing entity(s), or by doing it via the upper NMS management layer. When the operator turns this mode on, relevant management entities and usually the NMS start a new simulation session and record each simulated configuration change for further decisions.

Some operations of the simulation mode are schematically depicted by the dashed arrows in the FIG. 2. After the simulation, if the user/NMS is not satisfied with its results, the system may perform full restore of the previously stored snap-shot (a "photo" of the previous condition of the management system, e.g. per management entity). Alternatively, if the changes were registered in so-called journals of changes at the managing entities, the roll-back may be performed incrementally, change by change.

A software simulation module SM (shown by a dashed box in FIG. 2) of NMS is in communication with software simulating modules (also seen as dashed boxes) of all the EMSs and, optionally, with the planning tools block. The planning tools may play a part of the simulation module at the NMS layer, if it is provided with the new functions explained before: real time operation, connection with the management system for exchanging management information, creating simulation flags to start the simulation mode, capability to exchange management with EMSs, integrate it with the management info of the NMS layer, a capability of virtually introducing desired changes for further simulation.

Simulation modules of the EMSs (not shown), when provided, are to be adapted to stop management communication between the EMSs and their respective NEs, to allow performing simulation of the desired changes at the suitable EMS using specific management information preliminarily obtained from relevant NEs, and to prevent implementation of the simulated changes. Optionally, the modules can be capable of locally performing roll-back of their data base after the simulation (in case the roll-back is not performed centrally, by the NMS). For example, a simulation may be performed for changing a trail in the network or for changing characteristics of traffic over one or more existing trails. The answers (the results of simulation) which EMSs may give to NMS allow not only the understanding whether the change is possible (from the point of connectivity and/or protection), but also provide information about load in the network and quality of traffic expected after the desired change.

When operator/NMS/selected management entity turns the simulation mode off the entire network configuration is restored back, in all of the layers of the management hierarchy, exactly as it was when the simulation mode was turned on; the simulation session is closed and all the changes are rolled back.

The simulation mode may result in a decision to introduce changes, but if the changes are approved (e.g., by an upper layer management entity), they may be entered in the conventional mode either immediately, or later on.

It should be noted that the management entity (e.g., the operator/user controlling the NMS) may change the level of the "Blocking Wall" in the system (in case the system is designed to allow such flexibility). Generally, the proposed method and system cover the cases where the "Wall" is established between NMS and EMS layers, between EMS and NE layers, between NE main cards layer and NE line cards layer. A lower management layer (e.g., NEs layer) may then provide management information to an upper layer (the NEs to the EMS layer, and the EMS(s) to the NMS layer). In another case, a selected managing entity (such as NMS) may be just the managing entity itself, and does not send management data to any upper layer.

According to one embodiment, the technology may include changing the selected management layer. Changing the selected management layer may be done, for example in a next session of simulation, for obtaining more accurate results.

Figure 3:
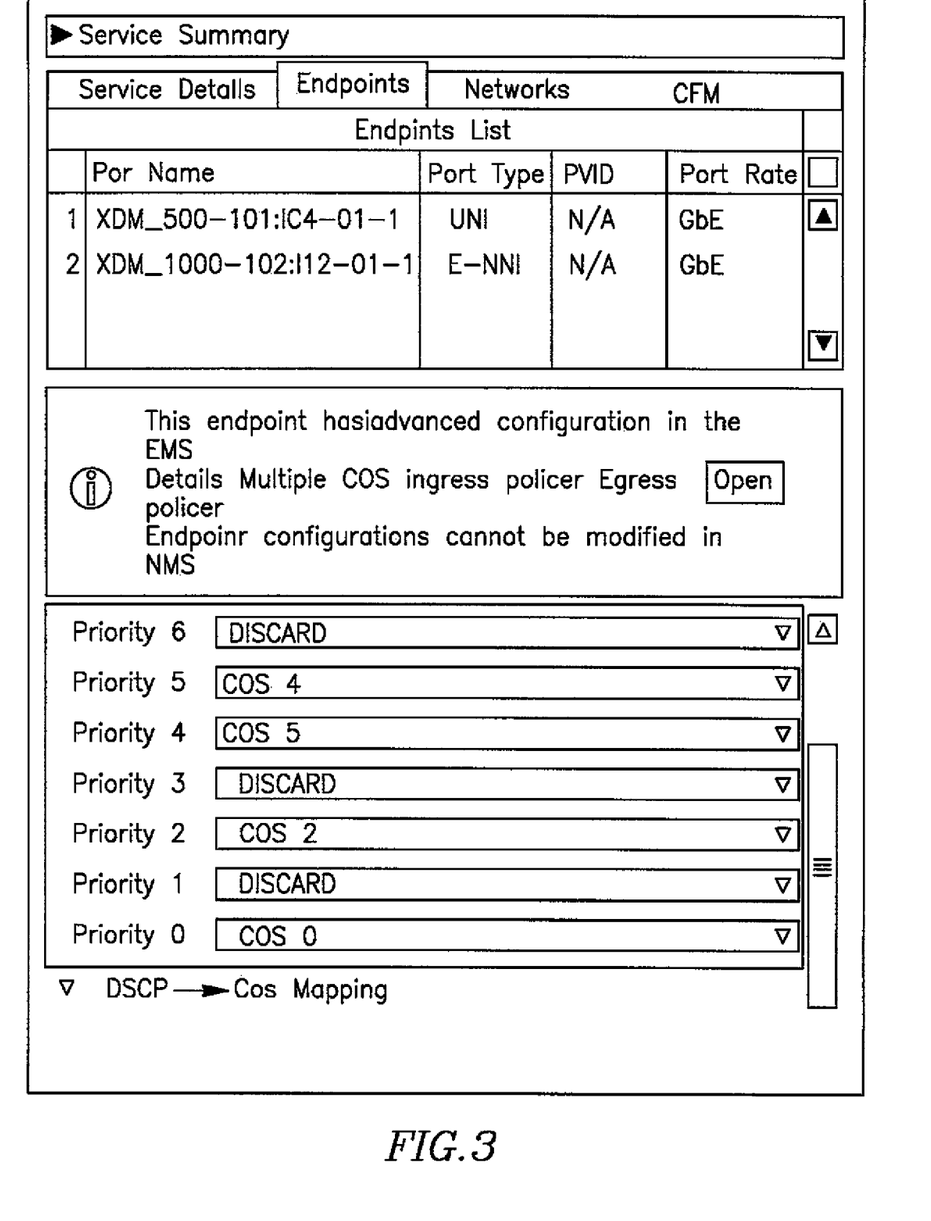
FIG. 3—is an exemplary diagram of a GUI at the upper (NMS) layer of the management system; the GUI reflects information which is available at the NMS about a specific multi-Class Of Service (COS) policer which is fully managed by a specific EMS at a lower (EMS) layer of the management system.

FIG. 3 shows that in the conventional mode, at the NMS layer GUI, there is no sufficient data on parameters of a multi-COS (Class of Service) policer which is managed at the EMS layer. Of course, there is also no possibility to affect/change such parameters at the NMS layer. Thus, there is no reason and no physical possibility to permanently keep in the NMS the full information concerning the under-laying levels of management. Although, management information such as validation reports, performance monitoring, etc. is being collected in the management system all the time.

However, for a limited period of time and for a specific static condition of the network which is "photographed" before a simulation mode, NMS would be adapted, according to the present invention, to integrate and perform processing of the management information collected from the under-laying layers either by simulating the network operation, with a desired change, at the NMS layer, or by updating the NMS about simulations performed by underlying managing entities.

During the simulation mode, the NMS may use its simulation module to simulate the network behavior and to make at the NMS layer at least some decisions. A major part of NMS decisions are presented to the operator.

Figure 4:
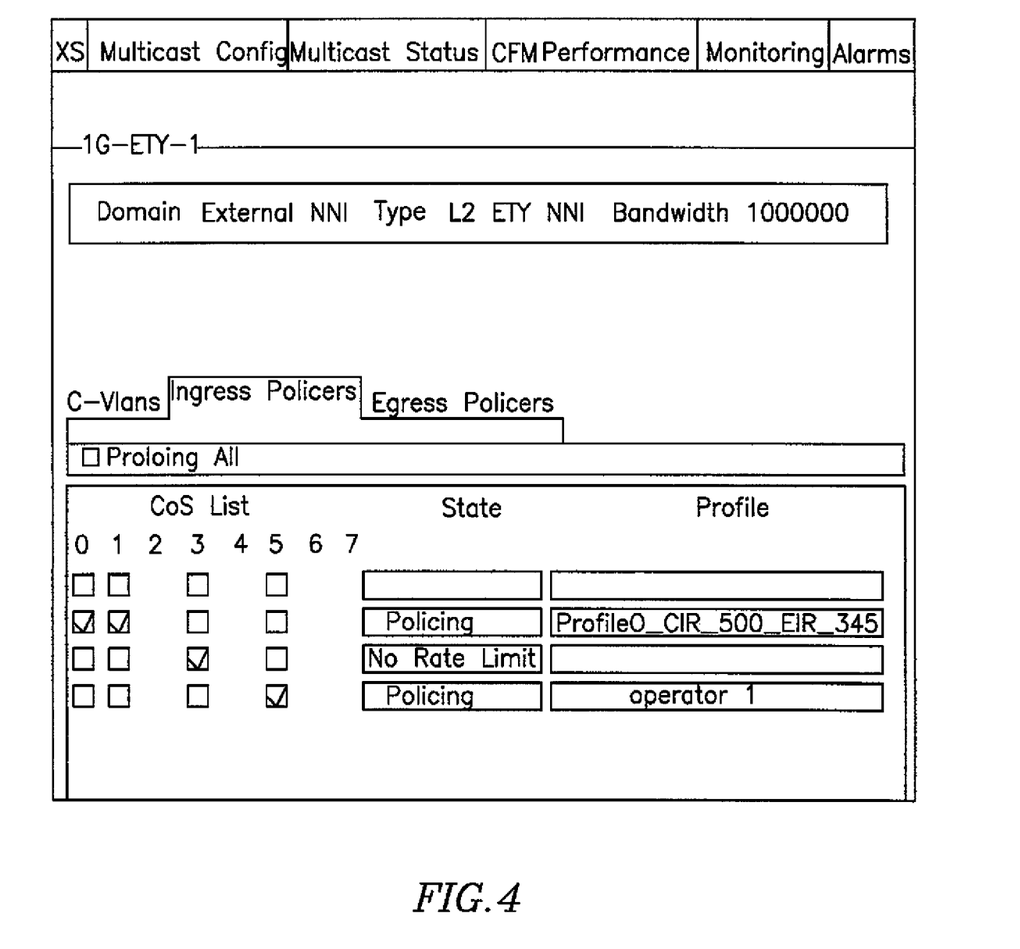
FIG. 4—is an exemplary diagram of the multi-COS policer GUI (referred to in FIG. 3), which exists and is managed at the EMS layer.

In FIG. 4 the specific above-mentioned multi-COS policer, which is managed at the EMS layer, can be seen in details in the EMS GUI (Graphical User Interface) related to this policer. For example, the drawing shows that a specific service Virtual Switching Instance (VSI) in MPLS network is carried via specific ports and even allows to see characteristics at these ports. If changes are to be applied to that specific service, NMS would not be able to perform simulation of such changes without collecting management information about it or without performing simulation at the EMS layer.

Figure 5:
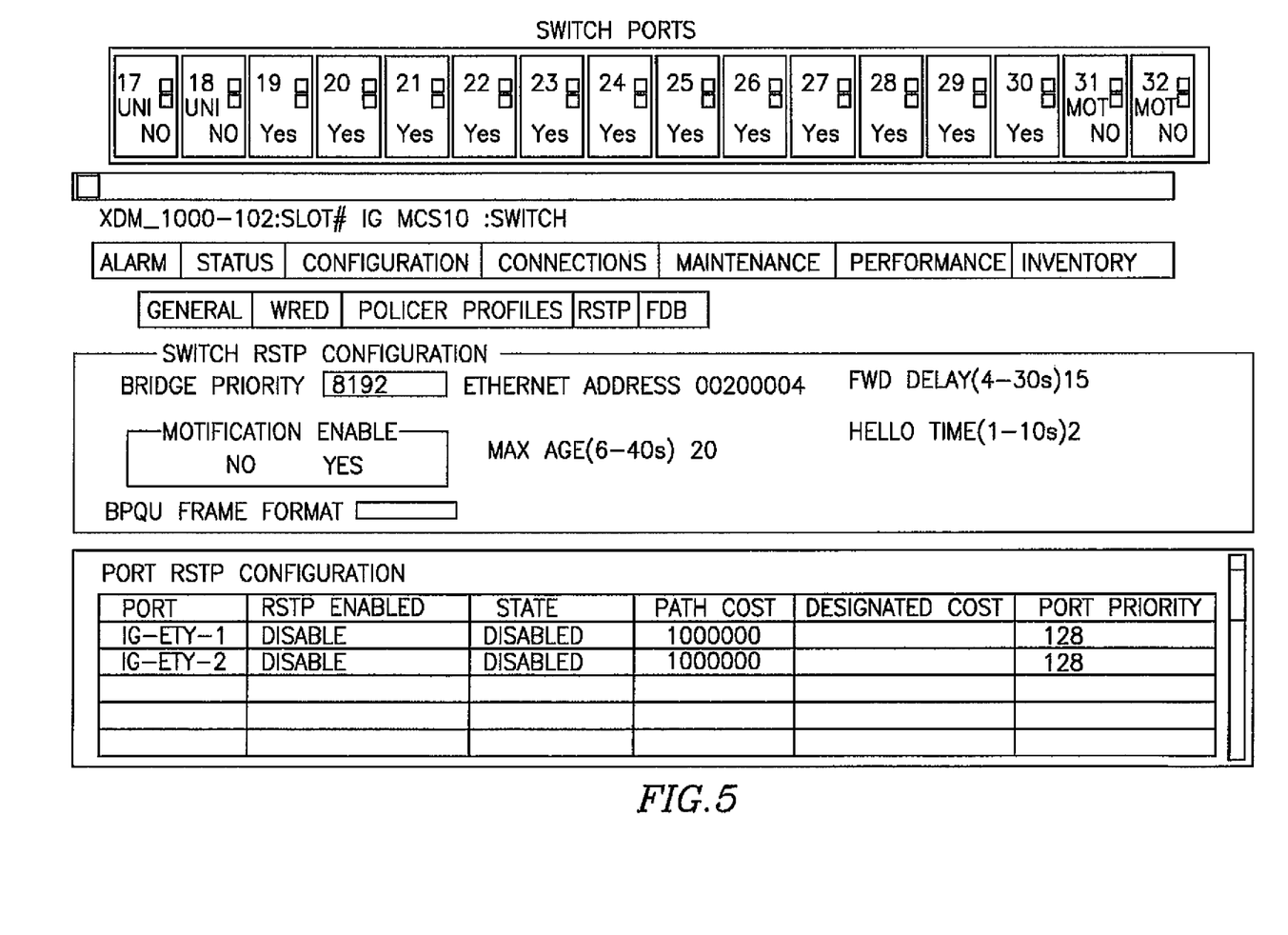
FIG. 5—is an exemplary diagram shows a GUI existing and being managed at the EMS layer, concerning Rapid Spanning Tree Protocol (RSTP) configuration of the network portion controlled by the specific EMS equipment, in this case concerning a switching equipment (NE) managed by a specific EMS.

FIG. 5 presents a GUI with some examples of RSTP configuration in a network portion managed by a specific EMS, more particularly in a cross-connecting equipment piece (such as the multiservice packet optical platform XDM commercially produced by ECI Telecom the assignee of this application). This information is not available to NMS. The user may learn of this information by receiving a status/validation information sent to NMS back from EMS (about rejecting or accepting of some change). It is of course much more efficient to receive such reports before and during the proposed simulation mode, without introducing real changes to the network.

It should be noted that a plurality of GUIs/other SW applications exist at the EMS layer, which may be used in the simulation mode (for example, will provide validation info to the NMS management layer, provided with a planning tool PT). For example, these GUIs may relate to various technological layers of the communication network and network protocols: GUI for MPLS services, GUI of MPLS tunnels, GUI of SDH traffic streams, GUI of WDM optical channels. Changes in one protocol/network layer may and usually will bring changes to upper protocol layers and all this chain of events may be processed in a suitable simulation module.

It should be appreciated that other versions of the method and different implementations of the system implementing the method may be proposed, and that they should be considered part of the invention whenever defined by the general claims which follow.

The invention claimed is:

1. A method of managing a communication network using a multi-layer management system having at least two management layers, each layer comprising one or more network elements, said network elements serving as managing entities and/or managed objects, the method comprising:
   selecting a management layer for simulating effects of at least one desired change in the selected management layer;
   performing simulation of operation while affecting the at least one desired change at the selected management layer and, during a period of time at which said simulation is being carried out, discontinuing exchange of management data between one or more network elements belonging to the selected management layer and one or more network elements belonging to another of the at least two management layers, whereas, during the period of carrying out the simulation, users' traffic is being conveyed in the communication network at a same way as before the simulation has begun;
   based on obtained simulation results, providing information that relates to expected communication network operation in case the at least one desired change is affected; and
   affecting the at least one desired change in one or more network elements belonging to said multi-layer management system, wherein the simulation step includes introducing a simulation flag to commands being forwarded by a managing element belonging to a hierarchically upper management layer to inform network elements belonging to a hierarchically underlying management layer that the simulation is about to be carried out and ordering said network elements that belong to the hierarchically underlying management layer to discontinue their management communication with network elements that belong to a lower management layer.

2. The method according to claim 1, wherein the selected management layer is a NMS (Network Management System) layer, the one or more managing entities are NMS elements, and the another management layer is an EMS (Element Management System) layer; the simulation being carried out in the one or more NMS elements based on management data previously obtained from the EMS layer.

3. The method according to claim 1, wherein the selected management layer is an intermediate management layer, the method further comprising utilizing results of said simulation at a hierarchically higher management level by forwarding the results of the simulation to the hierarchically higher management layer.

4. The method according claim 1, comprising a preliminary step of entering a simulation mode, followed by the step of performing said simulation for the at least one desired change in the communication network; and a step of exiting the simulation mode and returning to a conventional mode; the method further comprising a decision step to decide whether to keep or to discard the simulation results.

5. A multi-layer management system of a communication network, having the system comprising:
   at least two hierarchical management layers implemented in hardware, each layer comprising one or more network elements, said network elements serving as managing entities and/or managed objects, wherein at least one network element belonging to one of said two hierarchical management layers is provided with a simulation module,
   wherein said simulation module is configured to select a management layer for simulating effects of at least one desired change in the selected management layer, perform the simulation of operation while affecting at least one desired change associated with one or more network elements belonging to at least another of the at least two hierarchical management layers,
   wherein said simulation module is configured to discontinue exchange of management data between one or more network element belonging to the selected management layer and at least one network element belonging to a different management layer, whereas, during a period of time at which said simulation is being carried out by the simulation module, users' traffic is being conveyed in the communication network at a same way as before the simulation has begun,
   wherein the system is configured to utilize results of the performed simulation for affecting the at least one desired change in one or more network elements belonging to said multi-layer management system in case the at least desired change is affected, wherein the simulation includes introducing a simulation flag to commands being forwarded by a managing element belonging to a hierarchically upper management layer to inform network elements belonging to a hierarchically underlying management layer that the simulation is about to be carried out and ordering said network elements that belong to the hierarchically underlying management layer to discontinue their management communication with network elements that belong to a lower management layer.

6. A software product comprising data and/or computer implementable instructions stored on a non-transitory computer readable storage medium, the software product being configured, when being run on one or more computer processors, to carry out the steps of the method claimed in claim 1.

\* \* \* \* \*